Nov. 28, 1967    A. T. CAPE    3,355,283
BRAZING ALLOY
Filed June 11, 1965
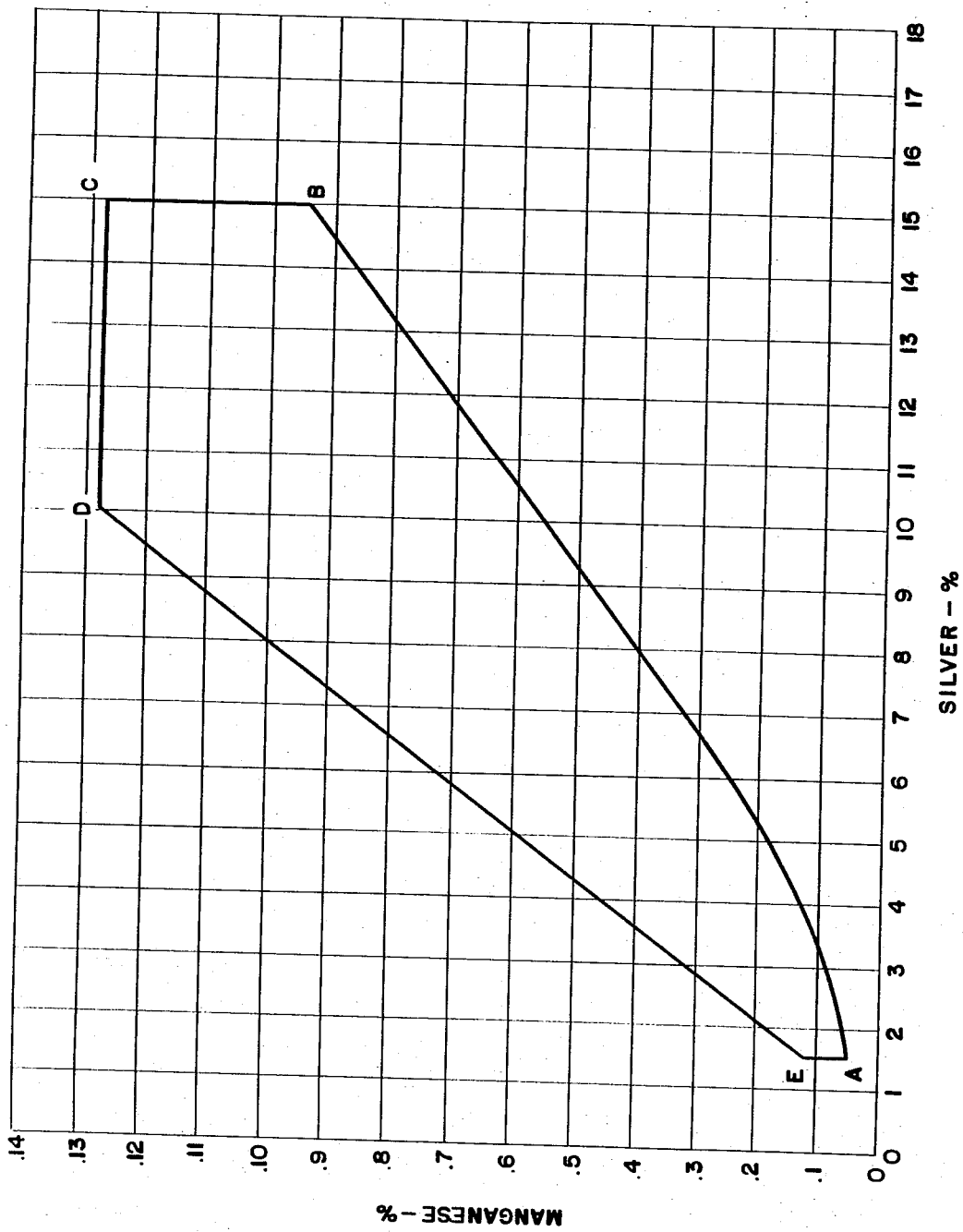
INVENTOR.
ARTHUR T. CAPE
BY Isler & Ornstein
ATTORNEYS 3,355,283
BRAZING ALLOY
Arthur T. Cape, Monterey, Calif., assignor to Coast Metals, Inc., Little Ferry, N.J., a corporation of Delaware
Filed June 11, 1965, Ser. No. 463,402
2 Claims. (Cl. 75—151)

This invention relates generally to brazing alloys, but has reference more particularly to brazing alloys of the cadmium-silver type.

A well-known cadmium-silver brazing alloy is one containing 95% cadmium and 5% silver. This alloy has a strength of 11,200 pounds per square inch, in shear, as determined by pull-testing a lap joint specimen in which the alloy is used to braze No. 304 stainless steel to No. 304 stainless steel. The shear strength is not changed to any appreciable strength by increasing the silver content of the alloy to 15%.

I have found, however, that if small amounts of manganese, i.e., from about .075% to about 1.25%, are incorporated in such a cadmium-silver alloy, the shear strength of the brazing alloy can be increased to a range of from about 15,000 pounds per square inch, to about 25,000 pounds per square inch, as determined by pull-testing lap joint specimens in which the alloy is used to braze No. 304 stainless steel to No. 304 stainless steel.

In general, the amount of silver in the alloy should be from about 10 to 16 times the amount of manganese incorporated in the alloy, but it is preferred that the silver and manganese be present in coordinated amounts falling within the ranges defined by the area bounded by the line ABCDEA in the accompanying drawing.

In the drawing, it will be seen that the amount of silver in the alloy will vary from about 1.5% to about 15%, and that the amount of manganese in the alloy will vary from about .05% to about 1.25%, but that the permissible variation in the amount of manganese generally increases as the silver is increased up to about 10% silver, and then decreases as the silver content is increased to 15%. The 15% silver limit is set due to the fact that when the silver is in excess of 15%, the melting point of the alloy becomes too high for normal brazing procedures, particularly when brazing stainless steel to stainless steel. The 1.25% manganese limit is set by reason of the fact that no appreciable improvement in properties of the alloy for brazing purposes are achieved with larger amounts of manganese.

The percentages and ranges of silver, manganese and cadmium used in the alloy are fairly critical, and any appreciable departure therefrom will cause substantial and undesirable changes in the physical properties of the brazing alloy.

The brazing alloy, in accordance with the invention, may accordingly be defined as a silver-manganese-cadmium alloy, which consists of about 1.5% to about 15% silver, and about .075% to about 1.25% manganese in coordinated amounts falling within the ranges defined by the area bounded by the line ABCDEA in the accompanying drawing, the balance of the alloy being substantially all cadmium.

The brazing alloy may contain traces of one or more of the elements, titanium, beryllium, columbium, palladium, tin and lead, without appreciable changes in the properties of the alloy, but the total or aggregate amounts of these should not exceed 0.1%. It will be understood that the phrase "the balance of the alloy being substantially all cadmium," as used in the specification and claims, is to be construed as including such elements in this aggregate amount.

The brazing alloy has a low melting point, i.e., about 675° F., and has an effective brazing temperature range of from about 725° F. to about 800° F.

The brazing alloy is particularly useful for brazing copper to copper, stainless steel to copper, and stainless steel to stainless steel, and is generally useful for all brazing purposes, in which a low melting point, high strength, brazing material is required.

The brazing alloy is preferably made by melting the constituents of the alloy under a slag, and particularly a slag containing zinc chloride. Moreover, the best physical properties are obtained by melting the constituents of the alloy under a slag, in an argon atmosphere.

The silver is preferably added as a silver lithium alloy containing approximately 3% of lithium. Although the silver can be added by itself, the results are not as satisfactory as when it is added as a master alloy of silver lithium. The lithium content left in the alloy is less than 0.1%. There is naturally a loss of lithium in the process of melting and casting of the alloy.

Although the melting point of the alloy is not greatly different from that of the cadmium-silver alloy to which reference has been made, the present alloy apparently has one property which distinguishes it from said cadmium-silver alloy. This may be described as follows:

When the cadmium-silver alloy is made up into the form of a ring, and is used to braze two tubes, one of which is telescoped into the other, as by placing the ring on the end of the outer tube, the ring tends to melt and droop or fall away from the joint during the heating preliminary to the actual brazing. In contrast to this, a ring made of the present alloy remains in situ throughout the heating and does not droop or fall away.

A further advantage of the present alloy is that hard copper can be brazed with this alloy without causing a diminution in the hardness of the copper.

Examples of increased shear strength, as determined by pull-testing lap joint specimens in which the alloys are used to braze 304 stainless steel to 304 stainless steel are as follows:

| Alloy | Silver | Manganese | Cadmium | Shear Strength, p.s.i. |
|---|---|---|---|---|
| 1 | 4.7 | .3 | 95 | 19,200 |
| 2 | 9.4 | .6 | 90 | 19,600 |
| 3 | 14.06 | .94 | 85 | 22,000 |
| 4 | 4.6 | .4 | 95 | 23,200 |
| 5 | 9.2 | .8 | 90 | 19,360 |
| 6 | 13.8 | 1.2 | 85 | 19,520 |
| 7 | 9.25 | .75 | 90 | 20,000 |

It will be understood that various changes may be made in the alloy, without departing from the spirit of the invention or the scope of the appended claims.

Having thus described my invention, I claim:

1. A brazing alloy consisting of from about 1.5% to about 15% silver and about .05% to about 1.25% manganese in coordinated amounts falling within the ranges defined by the area bounded by the line ABCDEA in the accompanying drawing, the balance of the alloy being substantially all cadmium.

2. A brazing alloy consisting of about 4.6% silver, about .4% manganese, and about 95% cadmium.

References Cited

UNITED STATES PATENTS

| 2,100,314 | 11/1937 | Harder | 75—151 |
| 2,140,531 | 12/1938 | Kennedy | 75—151 |
| 2,141,201 | 12/1938 | Tausz | 75—151 |
| 3,124,453 | 3/1964 | Cape | 75—151 |

DAVID L. RECK, Primary Examiner.
RICHARD O. DEAN, Examiner.